US011057130B2

(12) United States Patent
Ash, Jr. et al.

(10) Patent No.: US 11,057,130 B2
(45) Date of Patent: Jul. 6, 2021

(54) AUTOMATIC SIGNAL STRENGTH INDICATOR AND AUTOMATIC ANTENNA SWITCH

(71) Applicant: MoJoose, Inc., Aliso Viejo, CA (US)

(72) Inventors: Daniel R. Ash, Jr., Laguna Niguel, CA (US); Ryan C. Henry, Santa Ana, CA (US)

(73) Assignee: MOJOOSE, INC., Laguna Niguel, CA (US)

( * ) Notice: Subject to any disclaimer, the term of this patent is extended or adjusted under 35 U.S.C. 154(b) by 0 days.

(21) Appl. No.: 16/457,995

(22) Filed: Jun. 29, 2019

(65) Prior Publication Data

US 2020/0169338 A1    May 28, 2020

Related U.S. Application Data

(63) Continuation of application No. PCT/US2017/069172, filed on Dec. 31, 2017.
(Continued)

(51) Int. Cl.
| | |
|---|---|
| *H04B 17/00* | (2015.01) |
| *H04B 17/318* | (2015.01) |
| *H01P 1/22* | (2006.01) |
| *H04W 52/24* | (2009.01) |
| *H04W 52/52* | (2009.01) |
| *H04M 1/724* | (2021.01) |

(52) U.S. Cl.
CPC .............. *H04B 17/318* (2015.01); *H01P 1/22* (2013.01); *H04M 1/724* (2021.01); *H04W 52/245* (2013.01); *H04W 52/52* (2013.01)

(58) Field of Classification Search
CPC .. H04B 17/318; H04B 7/15507; H04B 7/024; H01P 1/22; H04M 1/72519; H04W 52/245; H04W 52/52; H04W 24/08; H04W 24/10; H04W 52/146; H01Q 3/267; H01Q 21/22
See application file for complete search history.

(56) References Cited

U.S. PATENT DOCUMENTS

| | | | |
|---|---|---|---|
| 5,121,504 | A | 6/1992 | Toko |
| 5,170,494 | A | 12/1992 | Levanto |
(Continued)

FOREIGN PATENT DOCUMENTS

| | | |
|---|---|---|
| AU | 2008200143 A1 | 2/2008 |
| AU | 2011224018 B2 | 10/2011 |
(Continued)

OTHER PUBLICATIONS

WIPO, International Search Report received in International Application No. PCT/US2017/069172, dated Jul. 5, 2018, (5p.).
(Continued)

*Primary Examiner* — Phuoc H Doan
(74) *Attorney, Agent, or Firm* — Siritzky Law, PLLC

(57) ABSTRACT

Systems and methods for controlling a signal amplifier unit configured with an electronic communication device are disclosed. The signal bar level on the electronic communication device is determined, and the signal amplifier unit is turned on based on the determined signal bar level. The signal level of the signal amplifier unit may be measured, and attenuation may be added based on the measured signal level. The measured signal level may be compared to a target level.

22 Claims, 7 Drawing Sheets

Related U.S. Application Data

(60) Provisional application No. 62/441,552, filed on Jan. 2, 2017.

(56) References Cited

U.S. PATENT DOCUMENTS

| | | |
|---|---|---|
| 5,278,571 A | 1/1994 | Helfrick |
| 5,338,896 A | 8/1994 | Danforth |
| 5,532,703 A | 7/1996 | Stephens et al. |
| 5,550,552 A | 8/1996 | Oxley |
| 5,557,287 A | 9/1996 | Pottala et al. |
| 5,673,053 A | 9/1997 | Marthinsson |
| 5,711,014 A | 1/1998 | Crowley et al. |
| 5,726,383 A | 3/1998 | Geller et al. |
| 5,777,261 A | 7/1998 | Katz |
| 5,777,585 A | 7/1998 | Tsuda et al. |
| 5,787,340 A | 7/1998 | Sepponen |
| 5,852,421 A | 12/1998 | Maldonado |
| 5,854,970 A | 12/1998 | Kivela |
| 5,907,794 A | 5/1999 | Lehmusto et al. |
| 5,963,843 A | 10/1999 | Sit et al. |
| 5,966,098 A | 10/1999 | Qi et al. |
| 5,983,072 A | 11/1999 | Schroderus |
| 5,995,064 A | 11/1999 | Yanagisawa et al. |
| 6,026,288 A | 2/2000 | Bronner |
| 6,031,495 A | 2/2000 | Simmons et al. |
| 6,061,028 A | 5/2000 | Sakata |
| 6,082,535 A | 7/2000 | Mitchell |
| 6,111,545 A | 8/2000 | Saari |
| 6,112,106 A | 8/2000 | Crowley et al. |
| 6,132,306 A | 10/2000 | Trompower |
| 6,249,256 B1 | 6/2001 | Luxon et al. |
| 6,281,854 B1 | 8/2001 | Ohoka et al. |
| 6,317,089 B1 | 11/2001 | Wilson et al. |
| 6,341,217 B1 | 1/2002 | Wong |
| 6,359,213 B1 | 3/2002 | Long |
| 6,380,623 B1 | 4/2002 | Demore |
| 6,459,915 B2 | 10/2002 | Nakamura et al. |
| 6,492,952 B1 | 12/2002 | Hu |
| 6,492,957 B2 | 12/2002 | Carillo, Jr. et al. |
| 6,515,223 B2 | 2/2003 | Tashjian |
| 6,538,607 B2 | 3/2003 | Bama |
| 6,538,620 B2 | 3/2003 | Lin |
| 6,568,576 B1 | 5/2003 | Godshaw et al. |
| 6,576,832 B2 | 6/2003 | Svarfvar et al. |
| 6,603,981 B1 | 8/2003 | Carillo, Jr. et al. |
| 6,611,235 B2 | 8/2003 | Bama et al. |
| 6,615,026 B1 | 9/2003 | Wong |
| 6,624,789 B1 | 9/2003 | Kangasvieri et al. |
| 6,697,603 B1 | 2/2004 | Lovinggood et al. |
| 6,711,387 B1 | 3/2004 | Lungley |
| 6,768,523 B2 | 7/2004 | Cheng et al. |
| 6,855,883 B1 | 2/2005 | Matsui |
| 6,856,819 B2 | 2/2005 | Itoh |
| 6,871,079 B1 | 3/2005 | Choi et al. |
| 6,880,737 B2 | 4/2005 | Bauer |
| 6,924,769 B2 | 8/2005 | Ito et al. |
| 6,924,770 B2 | 8/2005 | Carpenter et al. |
| 6,947,000 B2 | 9/2005 | Ito |
| 6,950,674 B2 | 9/2005 | Jarrett |
| 6,980,777 B2 | 12/2005 | Shepherd et al. |
| 6,985,110 B2 | 1/2006 | Tanaka et al. |
| 7,031,762 B2 | 4/2006 | Shoji et al. |
| 7,065,379 B1 | 6/2006 | Kim et al. |
| 7,081,857 B2 | 7/2006 | Kinnunen et al. |
| 7,084,819 B2 | 8/2006 | De La Torre Barreiro et al. |
| 7,164,933 B1 | 1/2007 | Steigerwald et al. |
| 7,202,825 B2 | 4/2007 | Leizerovich et al. |
| 7,203,471 B2 * | 4/2007 | Cutcher ............ H03G 3/3052 455/200.1 |
| 7,206,618 B2 | 4/2007 | Latto et al. |
| 7,207,902 B1 | 4/2007 | Hamlin |
| 7,218,280 B2 | 5/2007 | Annamaa et al. |
| 7,230,574 B2 | 6/2007 | Johnson |
| 7,231,236 B2 | 6/2007 | Cho |
| 7,295,160 B2 | 11/2007 | Purr et al. |
| 7,327,841 B2 | 2/2008 | Schreiber et al. |
| 7,405,698 B2 | 7/2008 | de Rochemont |
| 7,405,702 B2 | 7/2008 | Annamaa |
| 7,427,961 B2 | 9/2008 | Song et al. |
| 7,477,915 B2 | 1/2009 | Leinonen et al. |
| 7,616,158 B2 | 11/2009 | Mak et al. |
| 7,643,848 B2 | 1/2010 | Robinett |
| 7,676,243 B2 | 3/2010 | Leinonen et al. |
| 7,719,083 B2 | 5/2010 | Chang |
| 7,812,770 B2 | 10/2010 | Qi et al. |
| 7,876,272 B2 | 1/2011 | Dou et al. |
| 7,881,693 B2 | 2/2011 | Kurokawa |
| 7,907,555 B1 | 3/2011 | Sankabathula et al. |
| 8,004,454 B2 | 8/2011 | Lindoff et al. |
| 8,027,635 B2 | 9/2011 | Wee et al. |
| 8,068,061 B2 | 11/2011 | Qi et al. |
| 8,150,309 B2 | 4/2012 | Braithwaite |
| 8,190,221 B2 | 5/2012 | Jain et al. |
| 8,214,003 B2 | 7/2012 | Wong et al. |
| 8,248,314 B2 | 8/2012 | Ash, Jr. et al. |
| 8,275,412 B2 | 9/2012 | Alameh et al. |
| 8,428,535 B1 | 4/2013 | Cousinard et al. |
| 8,519,885 B2 | 8/2013 | Ash, Jr. et al. |
| 8,559,869 B2 | 10/2013 | Ash, Jr. et al. |
| 8,560,029 B2 | 10/2013 | Ash, Jr. et al. |
| 8,594,584 B2 | 11/2013 | Greene et al. |
| 8,626,083 B2 | 1/2014 | Greene et al. |
| 8,750,948 B2 | 6/2014 | Wong et al. |
| 8,867,572 B1 | 10/2014 | Zhan |
| RE45,273 E | 12/2014 | Robinett |
| 9,124,679 B2 | 9/2015 | Ash, Jr. et al. |
| 9,813,139 B2 | 11/2017 | Ash, Jr. et al. |
| 2001/0051537 A1 | 12/2001 | Nakamura et al. |
| 2002/0009976 A1 | 1/2002 | Rashidi |
| 2002/0074142 A1 | 6/2002 | Katz |
| 2002/0140745 A1 | 10/2002 | Ellenby et al. |
| 2002/0154066 A1 | 10/2002 | Bama et al. |
| 2002/0171602 A1 | 11/2002 | Feibig et al. |
| 2002/0183013 A1 | 12/2002 | Auckland et al. |
| 2002/0193136 A1 | 12/2002 | Halkosaari et al. |
| 2003/0045246 A1 | 3/2003 | Lee et al. |
| 2003/0078037 A1 | 4/2003 | Auckland et al. |
| 2004/0014506 A1 | 1/2004 | Kemppinen |
| 2005/0079820 A1 | 4/2005 | Yamashita |
| 2005/0088345 A1 | 4/2005 | DeLa Torre Barreiro |
| 2005/0104782 A1 | 5/2005 | Peled et al. |
| 2005/0140474 A1 | 6/2005 | Kim |
| 2005/0195119 A1 | 9/2005 | Gaucher et al. |
| 2005/0227631 A1 | 10/2005 | Robinett |
| 2005/0286448 A1 | 12/2005 | Proctor |
| 2006/0002495 A1 | 1/2006 | Shirakawa et al. |
| 2006/0019696 A1 | 1/2006 | Brunel et al. |
| 2006/0022889 A1 | 2/2006 | Chiang et al. |
| 2006/0052112 A1 | 3/2006 | Baussi et al. |
| 2006/0135083 A1 | 6/2006 | Leinonen et al. |
| 2006/0135195 A1 | 6/2006 | Leinonen et al. |
| 2006/0232483 A1 | 10/2006 | Iwai et al. |
| 2006/0290575 A1 | 12/2006 | Pelzer |
| 2007/0004456 A1 | 1/2007 | Shimada |
| 2007/0082622 A1 | 4/2007 | Leinonen et al. |
| 2007/0218951 A1 | 9/2007 | Risheq et al. |
| 2007/0241977 A1 | 10/2007 | Vance |
| 2008/0165064 A1 | 7/2008 | Hill et al. |
| 2009/0124215 A1 | 5/2009 | Nysen |
| 2009/0156151 A1 | 6/2009 | Anguera et al. |
| 2009/0181735 A1 | 7/2009 | Griffin, Jr. et al. |
| 2009/0318094 A1 | 12/2009 | Pros et al. |
| 2010/0066625 A1 | 3/2010 | Kazanchian |
| 2010/0075595 A1 | 3/2010 | DeMarco et al. |
| 2010/0113111 A1 | 5/2010 | Wong et al. |
| 2010/0151917 A1 | 6/2010 | Wilson |
| 2010/0214180 A1 | 8/2010 | Krogerus |
| 2010/0216520 A1 | 8/2010 | Lee |
| 2010/0234081 A1 | 9/2010 | Wong et al. |
| 2010/0264211 A1 | 10/2010 | Jain et al. |
| 2010/0291965 A1 | 11/2010 | Tabe |
| 2011/0012794 A1 | 1/2011 | Schlub |
| 2011/0036912 A1 | 2/2011 | Guo et al. |

(56) References Cited

U.S. PATENT DOCUMENTS

| | | |
|---|---|---|
| 2011/0109515 A1 | 5/2011 | Rao |
| 2011/0140982 A1 | 6/2011 | Ozden et al. |
| 2012/0044115 A1 | 2/2012 | McCaughey et al. |
| 2012/0056789 A1 | 3/2012 | Sohn |
| 2012/0139805 A1 | 6/2012 | Yu et al. |
| 2012/0206302 A1 | 8/2012 | Ramachandran et al. |
| 2012/0206303 A1 | 8/2012 | Desclos et al. |
| 2012/0295554 A1 | 11/2012 | Greene et al. |
| 2012/0295555 A1 | 11/2012 | Greene et al. |
| 2013/0076573 A1 | 3/2013 | Rappoport et al. |
| 2013/0154761 A1 | 6/2013 | Ilkov |
| 2013/0328730 A1 | 12/2013 | Guterman et al. |
| 2014/0049434 A1 | 2/2014 | Greene et al. |
| 2014/0062799 A1 | 3/2014 | Sutherland et al. |
| 2014/0190841 A1 | 7/2014 | Nash |
| 2015/0009873 A1 | 1/2015 | Liu et al. |
| 2015/0063504 A1 | 3/2015 | Fan et al. |

FOREIGN PATENT DOCUMENTS

| | | |
|---|---|---|
| CN | 201004637 Y | 1/2008 |
| CN | 201233951 Y | 5/2009 |
| GB | 2378322 A | 2/2003 |
| JP | 2006148751 A | 6/2006 |
| WO | 2010098540 A2 | 9/2010 |
| WO | 2012158693 | 11/2012 |
| WO | WO 2018/126247 A3 * | 7/2018 ............... H04B 1/06 |

OTHER PUBLICATIONS

WIPO, International Written Opinion received in International Application No. PCT/US2017/069172, dated Jul. 5, 2018, (4p.).

WIPO, International Preliminary Report on Patentability received in International Application No. PCT/US2017/069172, dated Jul. 2, 2019, (5p.).

WIPO, International Search Report received in International Application No. PCT/US2012/056708, dated Dec. 24, 2012, (2p.).

EPO, Extended European Search Report received in Application No. EP12833478.6, dated Apr. 16, 2015, (5p.).

Office Action from Mexican Patent Office (IMPI) received in Application No. MX/a/2014/003443, dated Feb. 5, 2015, (3p.).

Office Action from Chinese Patent Office received in Application No. 201280056915.3, dated May 11, 2015, (10p.).

WIPO, International Search Report received in International Application No. PCT/US2016/041407, dated Oct. 26, 2016, (4p.).

WIPO, International Written Opinion received in International Application No. PCT/US2016/041407, dated Oct. 26, 2016, (4p.).

WIPO, Written Opinion received in International Application No. PCT/US2012/056708, dated Dec. 24, 2012, (4p.).

WIPO, International Preliminary Report on Patentability received in International Application No. PCT/US2012/056708, Feb. 11, 2014, (11p.).

* cited by examiner

| 534 CARRIER / PROVIDER | 536 PROTOCOL | 538 SIGNAL LEVELS | 540 OTHER/ MISC. |
|---|---|---|---|
| C1 | P1 | L0, L1, L2, L3, L4, L5 | O1 |
| C1 | P2 | L0, L1, L2, L3, L4, L5 | O2 |
| ... | ... | ... | ... |
| CN | PN | L0, L1, L2, L3, L4, L5 | ON |

AUTOMATIC SIGNAL STRENGTH INDICATOR AND AUTOMATIC ANTENNA SWITCH

RELATED APPLICATIONS

This application is a continuation of PCT/US17/69172, filed Dec. 31, 2017, which claims priority from U.S. Provisional patent application No. 62/441,552, filed Jan. 2, 2017, titled "AUTOMATIC SIGNAL STRENGTH INDICATOR AND AUTOMATIC ANTENNA SWITCH," the entire contents of both of which are hereby fully incorporated herein by reference for all purposes.

This application is related to U.S. patent application Ser. No. 14/216,985, filed Mar. 17, 2014, titled "Sleeve With Electronic Extensions For A Cell Phone," published as US 20140199950 on Jul. 17, 2014, issued as U.S. Pat. No. 9,124,679 on Sep. 1, 2015, the entire contents of which are hereby fully incorporated herein by reference for all purposes.

U.S. Ser. No. 14/216,985 is a continuation of International Application No. PCT/US2012/056708, filed Sep. 21, 2012, which claims the benefit of the following, the entire contents of each of which are hereby fully incorporated herein by reference for all purposes: (i) U.S. patent application Ser. No. 13/238,894, filed Sep. 21, 2011, titled "Inductively coupled signal booster for a wireless communication device and in combination therewith," now U.S. Pat. No. 8,248,314, issued Aug. 21, 2012, and which claims priority from provisional patent application No. 61/385,386, filed Sep. 22, 2010; and (ii) U.S. patent application Ser. No. 13/590,053, filed Aug. 20, 2012, titled "Combination hand-held phone and radar system," now U.S. Pat. No. 8,519,885, issued Aug. 27, 2013, which is a Continuation-In-Part (CIP) of U.S. application Ser. No. 13/238,894; and (iii) U.S. patent application Ser. No. 13/591,152, filed Aug. 21, 2012, titled "Smart channel selective repeater," now U.S. Pat. No. 8,559,869, issued Oct. 15, 2013, which is a CIP of application Ser. No. 13/238,894 and Ser. No. 13/590,053; and (iv) U.S. patent application Ser. No. 13/591,171, filed Aug. 21, 2012, titled "Isolation enhancement between planar antenna elements," now U.S. Pat. No. 8,560,029, issued Oct. 15, 2013, which is a CIP of application Ser. No. 13/238,894 filed on Sep. 21, 2011, and Ser. No. 13/590,053, filed on Aug. 21, 2012, and Ser. No. 13/591,152, filed on Aug. 21, 2012.

This application is also related to U.S. patent application Ser. No. 15/204,993, tiled "Automatic Antenna Switch," filed Jul. 7, 2016, issued as U.S. Pat. No. 9,813,139, Nov. 7, 2017, the entire contents of which are hereby fully incorporated herein by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to antennas, and, more particularly, to automatic RF switching for an electronic communications device.

BACKGROUND

U.S. Pat. No. 9,124,679 describes a passively re-radiating cell phone sleeve assembly capable of receiving a nested cell phone and providing signal boosting capabilities.

It is desirable to control and monitor aspects of the signal boosting and other capabilities of the cell phone sleeve assembly. More specifically, it is desirable, to selectively control aspects of operation of the cell phone sleeve assembly based on strength of the received signal.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIG. 5 is a data structure according to exemplary embodiments hereof;

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

RF means radio frequency.

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

Description

Figure 1:
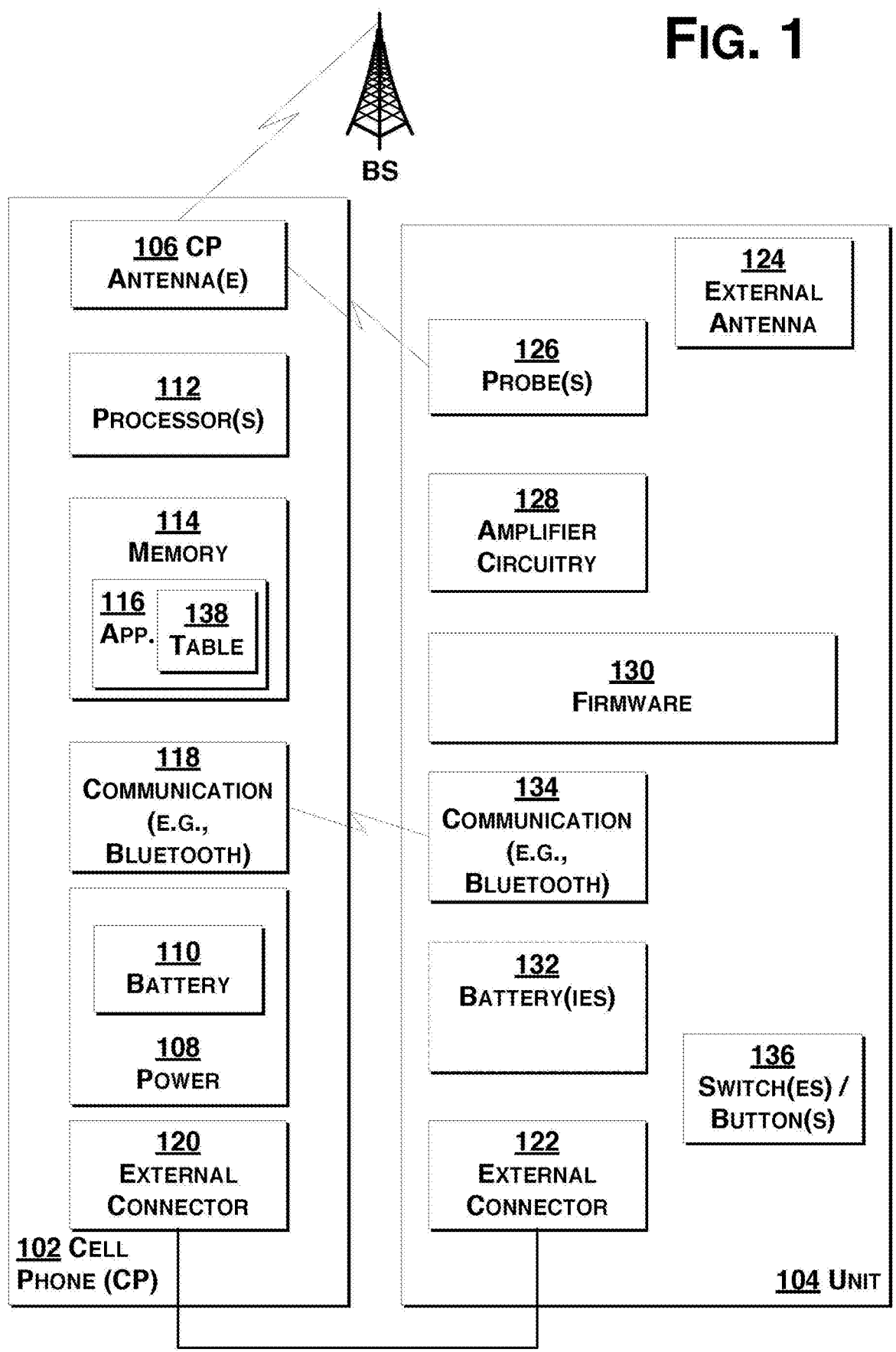
FIG. 1 is a block diagram depicting aspects of a system according to exemplary embodiments hereof.

FIG. 1 is a block diagram depicting aspects of a system 100 according to exemplary embodiments hereof. As shown in FIG. 1, an electronic communication device (e.g., a cell phone (CP)) 102 is connected (as described below) to a signal amplifier unit 104.

The electronic communication device 102 may be a conventional cell phone and may include cellular communications mechanisms (not shown) an antenna 106, a power system 108, including a battery 110. The electronic communication device 102 preferably includes one or more processors 112 and memory 114. The processor(s) 112 may execute programs stored in and/or using the memory 114 in order to effectuate operation of the electronic communication device 102. Typically the electronic communication device 102 runs manufacturer-provided programs (e.g., stored as firmware) to operate the device. The electronic communication device 102 may also support user-provided or externally provided software applications (sometimes referred to as "apps."). Embodiments hereof include application (App) 116.

The device 102 preferably includes a low-power short range communication mechanism (e.g., Bluetooth mechanism) 118. As is well known, Bluetooth is a wireless technology standard for exchanging data over short distances.

The electronic communication device 102 typically provides one or more external connectors 120 supporting, e.g., battery charging and the like.

The signal amplifier unit 104 may be a passively re-radiating cell phone sleeve assembly capable of receiving a nested cell phone and providing signal boosting capabilities, e.g., as described in U.S. Pat. No. 9,124,679, the entire contents of which have been fully incorporated herein for all purposes.

In preferred embodiments hereof the signal amplifier unit 104 includes an external connector mechanism 122 that allows the unit 104 to be electrically and operatively connected to the device 102 via the one or more external connectors 120 of the device 102. The connector(s) 120 and the connector mechanism 122 may be USB connectors or, in the case of recent iPhones, Apple Inc.'s proprietary Lightning computer bus and power connector.

The unit 104 may include an external antenna 124 and one or more probe antennas or connect probes 126. The connect probe(s) 126 is/are preferably positioned in the assembly unit 104 such that when a cell phone (CP) or the like is in the assembly 104, the connect probe(s) 126 is/are substantially adjacent at least one antenna 106 of the cell phone.

As should be appreciated, a mobile device such as a cell phone may have more than one antenna, and the unit 104 may, correspondingly, include more than one connect probe 126. Those of ordinary skill in the art will realize and appreciate, upon reading this description, that the position of the connect probes 126 in the unit's assembly will depend on the position(s) of the antenna(s) of the mobile device 102. The connect probe(s) 126 may be formed, e.g., as described in U.S. Patent Publication 20140199950 and/or U.S. Pat. No. 8,248,314.

The unit 104 preferably includes amplifier circuitry 128 and firmware 130 to control amplification of an RF signal to/from the cell phone.

The unit 104 may include one or more batteries 132 to provide power to the unit 104 itself as well as to provide backup power to a connected device 102 (e.g., via the external connector 122).

One or more external buttons 136 on the unit 104 may be used to selectively control the signal amplifier circuitry 128 and the backup battery power supply from batteries 132.

The unit 104 preferably also includes a low-power short-range communication mechanism (e.g., Bluetooth mechanism) 134 that allows the unit to communicate with a nearby or attached cell phone (CP) 102. As should be appreciated, the communication mechanism 134 should be able to communicate with the phone's communication mechanism 118 (e.g., they should both be Bluetooth mechanisms). Connection through USB or Apple Lightning will also work.

The amplification circuitry 128 effectively amplifies the signal to the cell phone 102. Operation of the amplification circuitry 128 may be selectively controlled by a user via one or more switches/buttons 136 on the unit. In addition, as described here, operation of the amplification circuitry 128 may be selectively controlled based on information provided by an application 116 running on the cell phone 102.

Figure 2A:
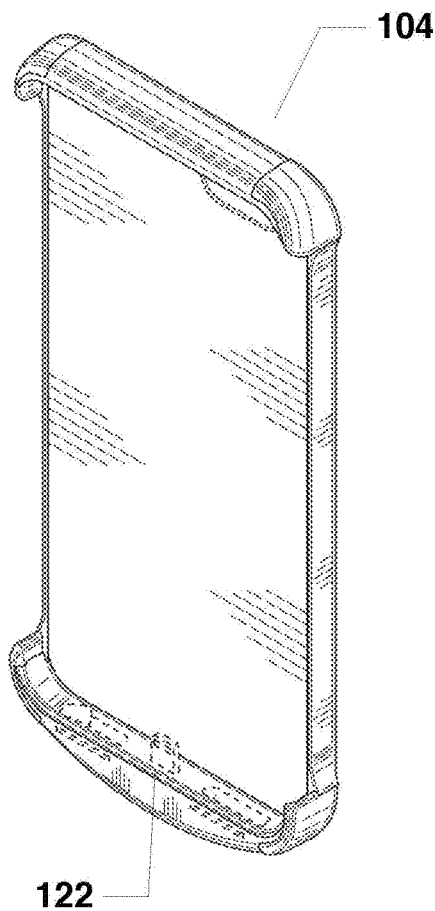
FIGS. 2A-2B show views of an exemplary unit according to exemplary embodiments hereof.
Figure 2B:
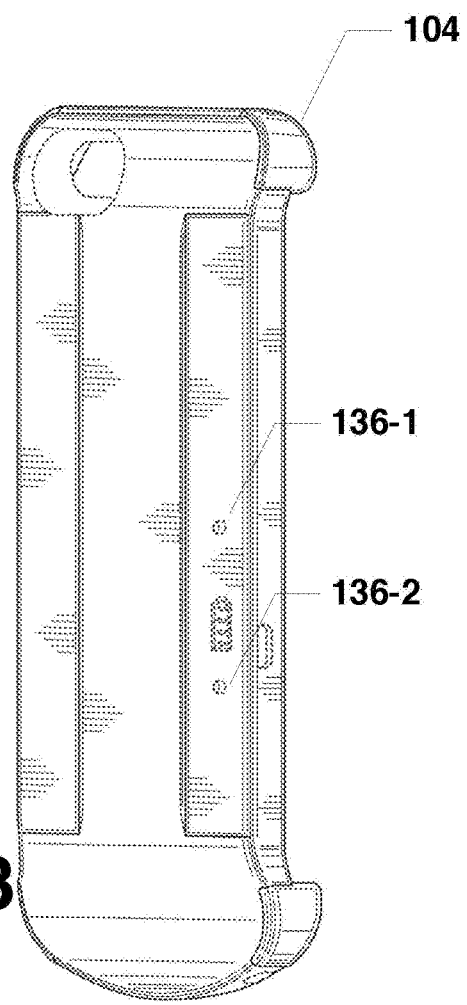

An exemplary unit 104 for an Apple iPhone is shown in FIGS. 2A-2B (showing front and rear perspective views thereof, respectively). As shown in FIG. 2B, the unit 104 includes two buttons 136-1, 136-2 (corresponding to switches/buttons 136 in FIG. 1) for operation of the amplification circuitry 128.

Connecting to a Cellular Service

In operation, upon activating the cellular mode of the cell phone 102, the phone 102 may attempt to synchronize to a nearby base station (cell tower) by quickly scanning the broadcast channels. (Note that the broadcast channels may be different in different countries.) The phone 102 may then lock onto an available wireless system based on the information it may receive. The selected connection may be 2G (GSM), 3G (CDMA, UMTS, HSPA), 4G (including various LTE technologies) or other types of systems, and the phone 102 may typically choose and connect to the system that may provide the best voice and data rate (also referred to as throughput rate).

In the current system 100, the cell phone (CP) 102 connected to the unit 104 may connect to a base station (BS) via its own antenna(e) 106. The cell phone 102 may use its own mechanisms to select an appropriate frequency band from a base station (BS) within which to operate. The base station may tell the phone a frequency to use. As described above, the cell phone (CP) may cycle through the various bands to find the one with the strongest signal. The phone 102 may then use a pilot signal to notify the base station (BS) of the frequency it (the phone) has selected.

Signal Strength

The absolute strength of a signal is measured in decibels (or dBm). As is well known, dBm are typically expressed as a negative number. The closer a signal strength in dBm is to zero, the stronger the signal. For example, −90 dBm is a stronger signal than −100 dBm.

From a phone user's perspective, the signal strength level is generally indicated by so-called "bars" (or dots) on their cell phone's display. Typical phones show from zero to five bars, with zero bars generally representing the lowest signal strength and five bars generally representing the greatest signal strength, thereby providing some indication of the strength of the signal being received. In this way, the user of the phone may refer to the signal bars to judge if they are within a good or poor network.

The bars generally indicate the relative strength of the available signal, but they do not indicate the actual signal strength. In addition, each phone manufacturer or provider may use its own algorithm(s) to determine how many bars to display for a particular signal level. The scale of the signal bars as well as the number of signal bars on different phones may also vary.

For this reason, a more accurate way to determine the network coverage is to consider the actual signal strength that may be expressed in dBm, a unit of power in decibel.

Figure 3A:
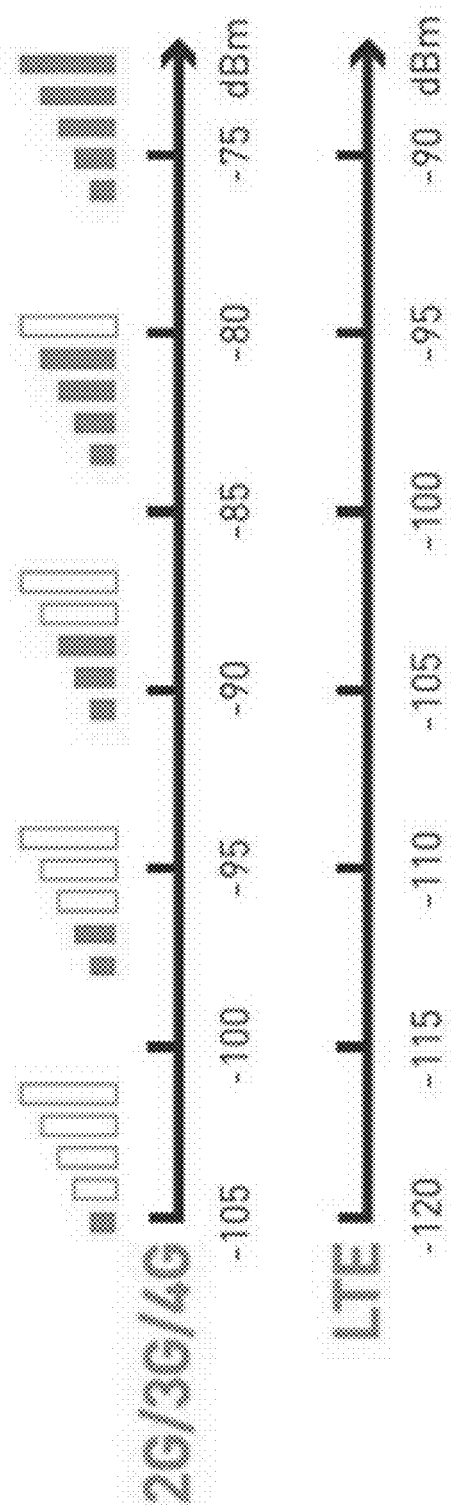
FIGS. 3A-3B show exemplary mappings from signal strengths to bars.
Figure 3B:
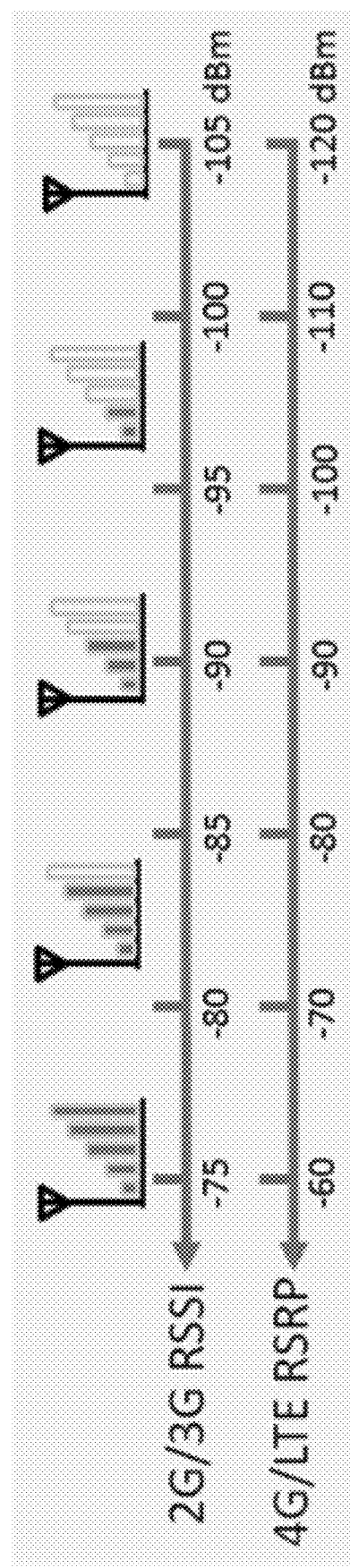

FIGS. 3A and 3B show example mappings of signal strengths (in dBm) to bars (or dots) for various protocols (2G/3G/4G and LTE) and example carriers/providers. The values shown may also be referred to as Receiver Signal Strength Indicator (RSSI) for 2G/3G networks, and Reference Signal Receive Power (RSRP) for 4G/LTE networks.

Note that in decibel scale, an increase of 3 dB is equivalent to doubling the power, a 10 dB increase corresponds to a 10× increase, and 20 dB and 30 dB increases correspond to 100× and 1000× respectively. As shown in the FIG. 3A, a 2G/3G/4G signal strength of −95 dBm corresponds to two bars, whereas the same signal strength for LTE corresponds to four bars.

Some cell phone manufacturers (e.g., Android-based phones) provide ways (e.g., APIs) for applications to get signal information (e.g., signal strength, carrier identification, and protocol) from their phones. In some cases a user may receive information regarding the signal strength and/or the associated network from the phone's settings, by setting the phone to Field Test Mode or using APIs. Presently, Apple does not allow user applications to get this information, although the information is readily available and the restrictions are purely policy based. A user may also determine what protocol their device may be using (e.g. 2G, 3G, 4G or LTE technologies), the frequency band and the channel.

Generally, when the phone 102 is in close proximity to a cell tower (base station), the transmission power (Tx power) from the phone may be low and the received power (Rx power) of the phone may be high because the phone is within a good coverage area. However, when the phone 102 may be located in a bad coverage area, the Tx power from the phone may need to be high to maintain the radio link but the received power of the phone may become low. This scenario may consume a significant amount of battery power in order to maintain the connection. In addition, if the Rx power drops below a certain threshold or level, the phone 102 may lose the connection to the cell power and the calls may be dropped.

Figure 7A:
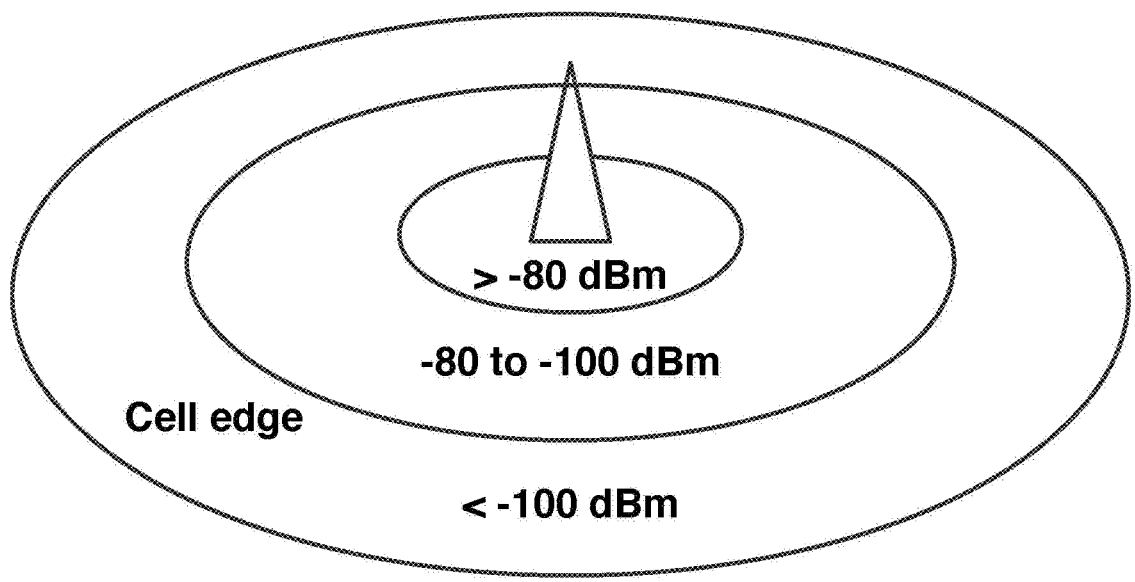
FIGS. 7A-7B show aspects of cellular networks.
Figure 7B:
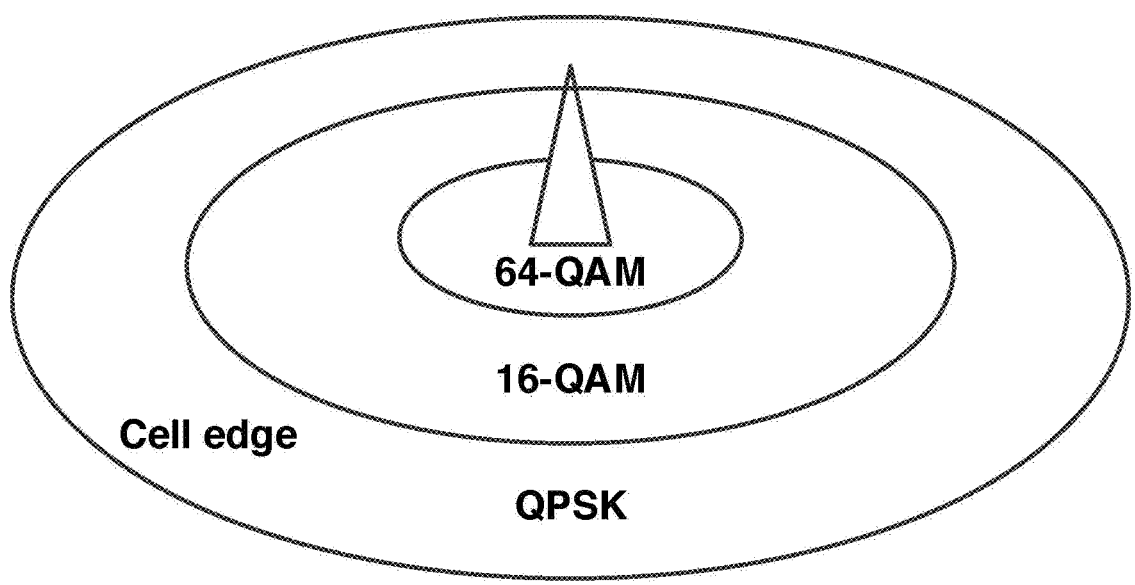

FIGS. 7A-7B show an overview of a cell network with the LTE technology, with FIG. 7A showing the received power by the phone, and FIG. 7B showing adaptive modulation. As shown, in the LTE network, 64-QAM, 16-QAM, and QPSK modulations can support 27 Mbps, 13 Mbps, and 4 Mbps (mega bit per second) data rates, respectively.

Coverage areas may be divided into categories such as excellent, good, and poor, as shown in FIG. 7A. As depicted, the center region (that may include the base station) may have corresponding RSRP or RSSI values that are greater than −80 dBm. The next area out may have RSRP or RSSI values ranging from −80 to −100 dBm and may be deemed good, and the area furthest out may have RSRP or RSSI values lower than −100 dBm and may be deemed poor.

Note that the wireless technology (among 2G/3G/4G) that may be able to provide the best service may be selected by the cell tower so that the user may experience the best speeds (higher data rates) for downlink and uplink. This may be true even if the signal strength of the selected technology may not be the greatest of the available technologies in the area (i.e., the number of the signal bars may be less). For example, an LTE network may have higher priority than the 3G network even if the RSRP of the LTE signal is −110 dBm while the call is maintained. However, the network service may be downgraded to a lower data rate if the received signal becomes worse (lower RSRP/RSSI).

In addition, each wireless technology may have a unique modulation scheme that may provide different data rates according to the environment where the cell phone may be located. For example, as shown in FIG. 7B, in a good coverage area the data link may use 64-QAM modulation to give the highest data rate; in a bad coverage area the data link may switch to QPSK modulation to get lower data rate. To date, a 4G network may provide a very good user experience for high-speed services up to 150 Mbps while the data rate of conventional 2G networks may be less than 1 Mbps.

The Application in Operation

In operation, the application 116 runs on the phone 102 when the phone is connected to the unit 104. The application 116 may be started by the user or it may be set to always run in the background when the phone 102 is running. The application 116 preferably communicates with a connected unit 104, e.g., via the communication mechanisms 118 (in the phone 102) and 134 (in the unit 104). Thus, when the communication mechanisms 118 and 134 support Bluetooth communication then the application 116 in the phone 102 communicates with the unit 104 using Bluetooth. The application 116 may provide information about the phone's status to the unit 104, and vice versa. For example, the application 116 may provide the unit 104 with information about one or more of: the strength of the signal being received by the phone; the carrier/provider; and the protocol. The unit 104 may provide the application with information about the various components of the unit (e.g., for diagnostic purposes).

Figure 4:
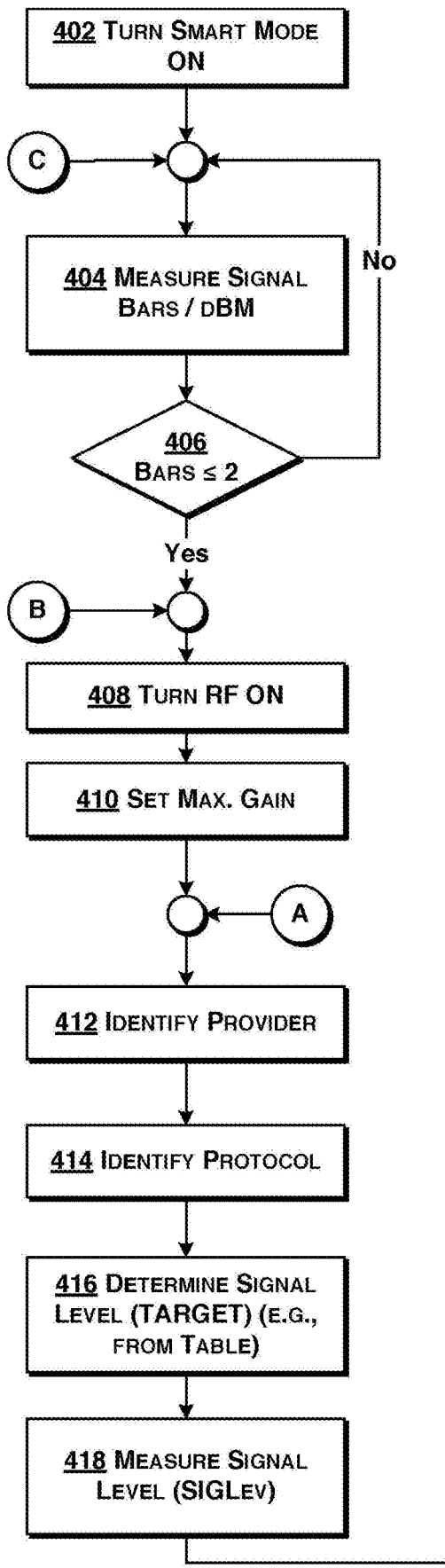
FIG. 4 is a flowchart depicting exemplary operation of a system according to exemplary embodiments hereof.
Figure 4:
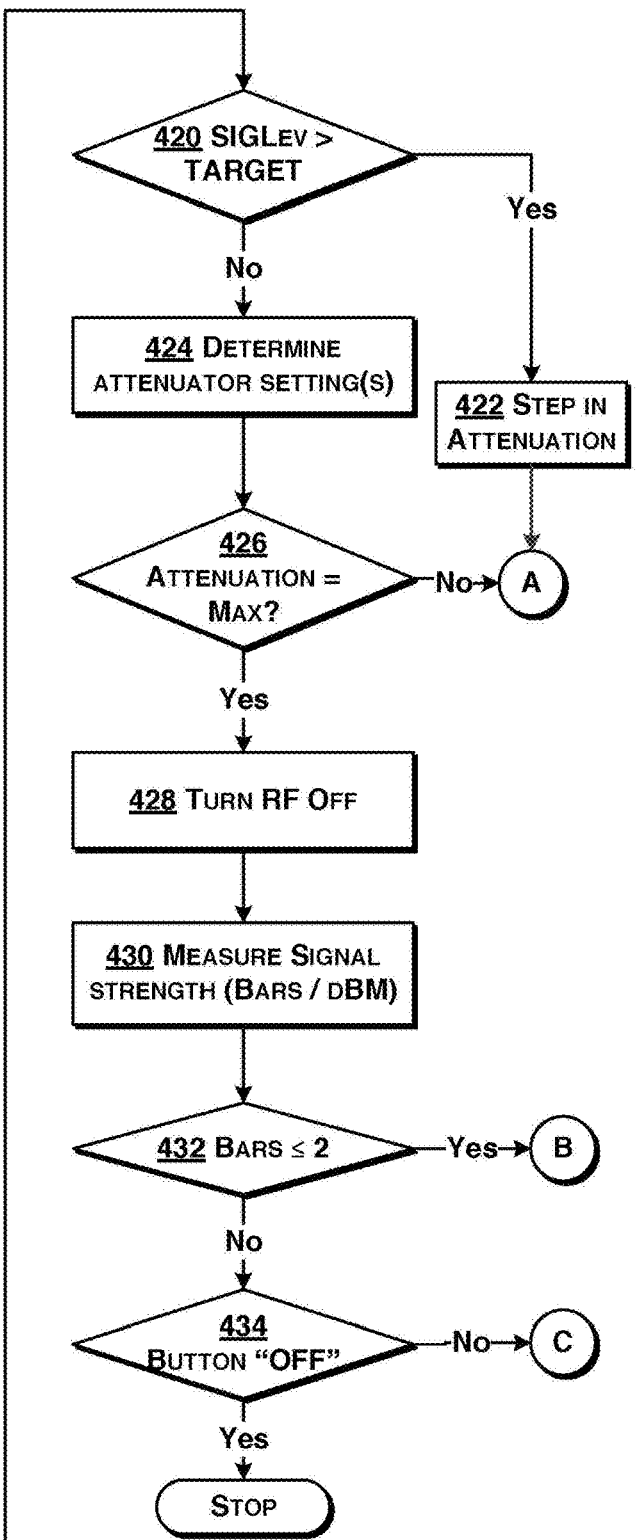
Figure 6A:
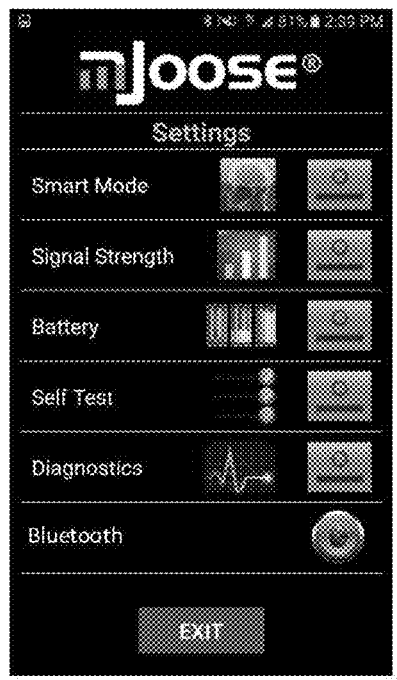
FIGS. 6A-6D are screen shots of an exemplary implementation of the application.
Figure 6B:
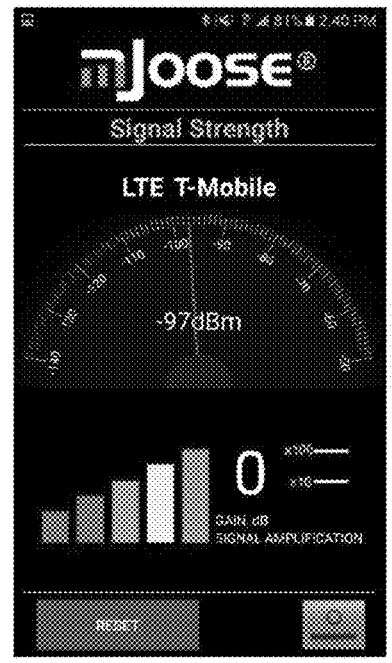
Figure 6C:
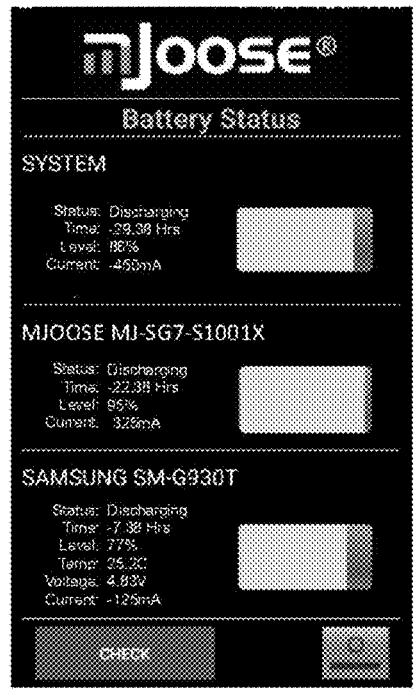
Figure 6D:
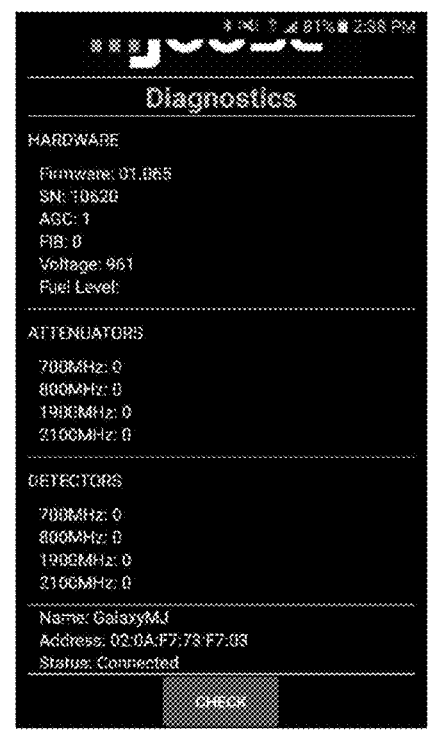

FIG. 4 is a flowchart depicting exemplary operation of a system according to exemplary embodiments hereof.

With reference to FIG. 4, first (at 402) a so-called "smart mode" is turned on. Then (at 404) the unit obtains the signal strength (either as a number of bars or in dBm). The unit 104 may obtain the signal strength from the application 116 operating on the cell phone 102. The application 116 may convert a number of bars to a corresponding signal strength, or it may have obtained the actual signal strength (in dBm) from the phone. In a presently preferred implementation the application 116 determines (at 406) whether the number of bars is two or less. If the number of bars is greater than two (as determined at 406), then there is no need to turn on the unit 104, and application 116 on the phone 102 keeps monitoring the signal strength (i.e., acts 404, 406 are repeated).

On the other hand, if the number of bars is less than two or determined minimum signal level dBm (as determined at 406), then the application 116 signals the unit 104 to turn on its signal amplification circuitry (at 408) and to set the gain to the maximum (at 410). The provider/carrier is identified (at 412) and the protocol is identified (at 414). Given the provider and protocol, a target signal level (TARGET) is determined (at 416), e.g., using a table lookup from a table 138 such as shown in FIG. 5. The table 138 may be stored with the application 116, in the memory 114 of the phone 102 and/or in a memory of the unit 104. The table 138 may be created by measurement of the various signals for various carriers and protocols. For example, the table may have entries for each protocol 536 supported by each carrier 534. The table entries per carrier/protocol pair may include various signal levels (e.g., in dBm) that define the ranges for different numbers of bars. For example, with reference again to FIG. 3, for that carrier, for protocol LTE, the signal strengths for 0, 1, 2, 3, 4, and 5 bars, respectively, are (in dBm): <−120, −120 to −115, −115 to −105; −105 to −100; −100 to −95, >−95 (summarized in the following table):

| Bars | 0 | 1 | 2 | 3 | 4 | 5 |
|---|---|---|---|---|---|---|
| Signal Strength (in dBm) | <−120 | −120 to −115 | −115 to −105 | −105 to −100 | −100 to −95 | >−95 |

As can be appreciated, the information needed for each carrier/protocol pair can be summarized with the five (5) numbers −120, −115, −105, −100, −95, and so this is all that needs to be stored in the table.

The signal level is measured (as SIGLev, at 418) and compared to the target signal (at 420). If the signal level (SIGLev) is greater than the target signal level (TARGET), as determined at 420, then an attenuator is stepped (at 422) and processing continues at 412 (see "A" in the flowchart). On the other hand, if the signal level (SIGLev) is not greater than the target signal level (TARGET), as determined at 420, then (at 424) the application 116 determines the attenuator settings on the unit 104, and determines (at 426) if the attenuation is at a maximum. If it is determined (at 426) that attenuation is not at a maximum, then processing continues at 412 (see "A" in the flowchart). On the other hand, if it is determined (at 426) that the attenuation is at a maximum, then the RF in the unit is turned off (at 428). Then the application 116 measures the signal strength (or obtains a measurement of the signal strength) (at 430) and determines if the number of bars is less than or equal to two (at 432). If it is determined (at 432) that the number of bars is less than or equal to two then processing continues at 408 (turn the RF on) (see "B" in the flowchart), otherwise processing continues to determine (at 434) if the button (for the RF feature) is turned off. If the button for the RF feature is off (as determined at 434) then processing stops, otherwise processing continues at 404 (see "C" in the flowchart).

As described here, the application checks (at 406 and 432) whether the number of bars is two (2) or less. Those of ordinary skill in the art will realize and appreciate, upon reading this description, that a different number of bars (e.g., 0, 1, 3, or 4) may be used for the comparison.

FIGS. 6A-6D depict screen shots of an exemplary implementation of the application 116.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A computer implemented method for controlling amplifier circuitry of a signal amplifier unit, wherein said amplifier circuitry controls amplification of a radio frequency (RF) signal to/from an electronic communication device, the method comprising, at said signal amplifier unit:
   (A) obtaining information from the electronic communication device configured with said signal amplifier unit, said information comprising at least a signal strength of an RF signal being received by said electronic communication device from a base station;
   (B) controlling said amplifier circuitry based on the signal strength obtained in (A);
   (C) measuring an amplified signal strength of an amplified signal produced by said amplifier circuitry; and
   (D) adjusting an amplification level of the amplifier based on the amplified signal strength measured in (C) to produce an adjusted amplified signal.

2. The method of claim 1 further comprising:
   (C)(1) comparing the signal strength of the amplified signal measured in (C) to a target signal level, wherein said adjusting in (D) is based on said comparing in (C)(1).

3. The method of claim 2, wherein the information obtained in (A) from the electronic communication device comprises said signal strength of said electronic communication device and one or more of: (i) carrier information; and/or (ii) protocol information, and wherein said target signal level is based on said signal strength and one or more of: (i) said carrier information; and/or (ii) said protocol information.

4. The method of claim 3, wherein the target signal level is determined by a lookup of a table.

5. The method of claim 4, wherein the table is stored on the signal amplifier unit and/or on the electronic communication device.

6. The method of claim 1, further comprising:
   (E) providing the adjusted amplified signal to the electronic communication device.

7. The method of claim 1, further comprising:
   repeating acts (A)-(D) multiple times.

8. The method of claim 1, wherein said information was determined on said electronic communication device and was provided to said signal amplifier unit via a wireless communication protocol.

9. The method of claim 8, wherein said wireless communication protocol comprises a low-power short-range communication protocol.

10. The method of claim 1, wherein the signal amplifier unit comprises one or more batteries to provide backup power to the electronic communication device.

11. The method of claim 10, wherein the signal amplifier unit provides backup power to the electronic communication device via an external connector.

12. The method of claim 1, wherein the electronic communication device is a cell phone comprising at least one antenna, and wherein the signal amplifier unit is wirelessly connected to the at least one antenna of the electronic communication device.

13. The method of claim 12, wherein the signal amplifier unit comprises one or more probe antennas, and wherein the probe antennas are adjacent the at least one antenna of the electronic communication device.

14. The method of claim 13, wherein the signal amplifier unit comprises a cell phone sleeve assembly capable of receiving a nested cell phone, and wherein the electronic communication device is nested in the sleeve assembly.

15. A device comprising:
   amplifier circuitry; and
   a processor and memory,
   wherein the device is constructed and adapted to:
   (a) obtain information from electronic communication device configured with said device, said information comprising at least a signal strength of a radio frequency (RF) signal being received by said electronic communication device;
   (b) control said amplifier circuitry based on the signal strength obtained in (a);
   (c) measure an amplified signal strength of an amplified signal produced by said amplifier circuitry; and
   (d) attenuate the amplified signal based on the amplified signal strength measured in (c) to produce an attenuated amplified signal.

16. The device of claim 15, further constructed and adapted to:
   (e) provide the attenuated amplified signal to the electronic communication device.

17. The device of claim 15, further comprising at least one battery for providing backup power to said electronic communication device.

18. The device of claim 15, wherein the device comprises a cell phone sleeve assembly capable of receiving a nested electronic communication device, the device further comprising:
   one or more probe antennas positioned and configured to be adjacent at least one antenna of the electronic communication device when the electronic communication device is nested in the sleeve assembly.

19. The device of claim 18, wherein the electronic communication device comprises a cell phone.

20. The device of claim 15, wherein said amplified signal is attenuated in (D) based on a comparison of the signal strength of the amplified signal measured in (c) relative to a target signal level.

21. The device of claim 20, wherein the information obtained in (a) from the electronic communication device comprises said signal strength of said electronic communication device and one or more of: (i) carrier information; and/or (ii) protocol information, and wherein said target signal level is based on said signal strength and one or more of: (i) said carrier information; and/or (ii) said protocol information.

22. The device of claim 20, wherein the target signal level is determined by a lookup of a table stored on the signal amplifier unit and/or on the electronic communication device.

* * * * *